Patented Mar. 4, 1952

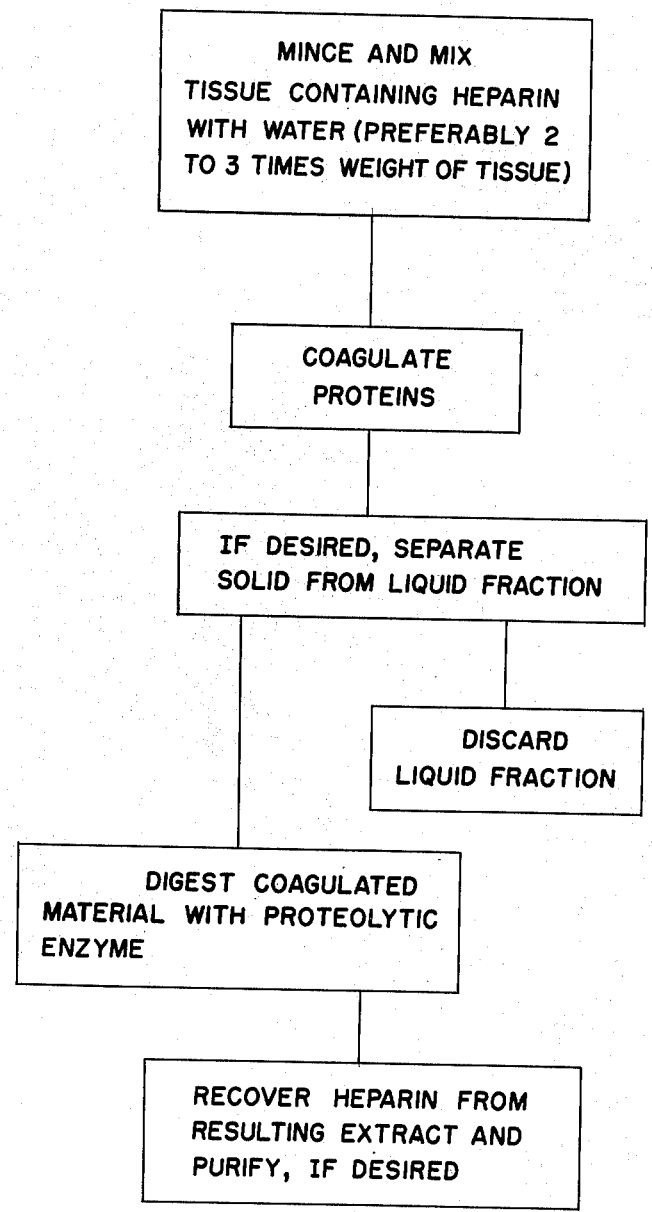

2,587,924

UNITED STATES PATENT OFFICE 2,587,924

METHODS OF PRODUCING HEPARIN

Edith M. Taylor and Peter J. Moloney, Toronto, Ontario, Canada, assignors to The Governors of The University of Toronto, Toronto, Ontario, Canada Application May 27, 1948, Serial No. 29,670

10 Claims. (Cl. 167—74)

This invention relates to a novel method of extracting heparin from animal tissues, whereby an extract containing greatly increased yields of heparin may be obtained as compared with the yields obtainable by previous processes.

Of the various tissues which are known or used as sources of heparin, beef lung has been found particularly useful. We have also found that beef or pork intestine, particularly the small intestine, yields large amounts of heparin.

In previous methods of extracting heparin from tissues, a large part of the tissue proteins has been separated from the extract prior to treating the extract with enzymes, especially trypsin, for further elimination of proteins. We have found that the yield of heparin is very greatly increased when an enzyme treatment is applied to the tissues to be extracted before the proteins have been separated.

We have also found that the new treatment proceeds more smoothly when the minced tissue is heated to a temperature of about 70 to 90° C. for about ten minutes, to coagulate the proteins. We have found that the temperature and time of such heating are not critical; for instance, we have found that temperatures up to ten pounds steam pressure may be employed, but it is important that the treatment be at a sufficient temperature for a sufficient time to coagulate much or all of the protein. This is particularly important in the treatment of lung tissue. In the treatment of intestinal tissue, it is possible to omit the heating step and still obtain good yields, but the process is more difficult to operate and less satisfactory than when the heating step is employed.

A flow sheet of a preferred practice of our invention is shown in the accompanying drawing.

According to our method, the tissue to be extracted is minced and mixed with a suitable amount of water. In the case of lung tissue, it is convenient to use from about two to three times the weight of water as of lung tissue. This mixture is then heated to about 85° C. and maintained at this temperature for about 10 minutes. The excess cooking water is then drained off, together with any contained fats, by crude filtration, for instance, through cheesecloth or fine wire mesh. In the case of intestinal tissue, it is more convenient to use only about half as much water as intestinal tissue and to omit the draining because, in the case of this tissue, the heparin-containing material becomes more finely divided and some may be lost in the draining unless relatively finer filtering methods are used. In the case of intestinal tissue it is also desirable, before commencing enzyme treatment, to cool the heated mixture in order to permit separation of the major portion of the fat. Otherwise subsequent separation of solids and liquid may be difficult.

After the heating step and the draining step, if used, the tissue is treated with a suitable proteolytic enzyme preparation, such as commercial trypsin, enzyme-containing extracts of pancreatic tissue, or enzyme-containing extracts of pancreatic tissue residues such as are described in application for U. S. Letters Patent, Serial Number 705,248 now Patent No. 2,571,126 (Series of 1935). Certain protease enzymes of bacteriological origin, which digest proteins at a pH between 7 and 8, have also been found effective, for example, the protease now being marketed by Rohm & Haas designated "Protease 15."

For the enzyme treatment, the temperature of the tissue mass resulting from the first step is advantageously adjusted to a temperature near the optimum temperature for the action of the enzymes, for example, around 45° C. (By "optimum temperature" we mean optimum from the standpoint of combining digestion of protein and suppression of bacterial action.) The enzyme may be added in dry or liquid form; but, to impart to the mass a convenient consistency for the treatment, the water content of the mix during treatment should advantageously be about three to four times the weight of the original tissue, whether it be lung or intestinal. The amount of water to be added for this purpose varies, of course, with the amount of water remaining after the first step and with the amount of water, if any, which may be added with the enzyme. In referring to the weight of the original tissue, we mean the weight of the original tissue with its naturally contained water, not its dry weight, nor its weight after the addition of water.

A suitable preservative, for example 1% of toluene is also preferably added to the volume of the total digestion mixture, to inhibit the growth of bacterial contamination.

The enyzme treatment is continued until all the tissue, or at least a major portion thereof, has been digested, which usually takes about 18 hours. The yield of heparin reaches at least 50 to 60% of the ultimate total after a few hours of treatment, but continues to increase gradually until substantially all the tissue has been digested.

During the enzyme treatment, the mass is preferably stirred or subjected to other form of mild agitation.

At the start of the enzyme treatment, the acidity of the mass is adjusted to about pH 8 and during the first few hours should be watched and readjusted every half hour or so to about pH 8 to prevent it from becoming unduly acid. After the first few hours, the acidity changes relatively slowly, if at all, but it is advisable to check the acidity throughout the treatment and to readjust it, if it changes materially, at least until the rate of change in the particular digestion being conducted has become so well established that the acidity of the mixture will not become more acid than pH 7.8 during the period of digestion.

After the digestion, the extract is separated from the supernatant fat, for example, by cooling and removing the solidified fat or by drawing the extract from the supernatant liquid fat. The extract will be found to contain a high yield of heparin; for example, the yields we have obtained by our method in this crude extract have averaged over 7,000 units per pound of lung or intestinal tissue treated.

Crude heparin may be precipitated from this extract by known procedures, for example, by acetone precipitation methods described by Charles and Scott in Transactions of the Royal Society of Canada, section V, Vol. XXVIII (1934), page 56. However, we have found the following simple procedure to be advantageous.

The acidity of the extract is reduced to about pH 2, advantageously with hydrochloric acid, and the resulting precipitate of crude heparin is separated by centrifuging or filtering. This precipitate is mixed with a quantity of about 0.3% sodium hydroxide solution, equal in volume to about one-tenth of the volume of the crude extract before precipitation, and the acidity of the mixture is adjusted to pH 10.5—11.0 with 30% sodium hydroxide solution if necessary. To the resulting mixture a quantity of calcium chloride dihydrate is added equal in weight to about one-fifth of the weight of the 0.3% sodium hydroxide solution used in the preceding step. This mixture is heated to about 65° C. with stirring and the resulting partly coagulated mixture is filtered or centrifuged. The residue is then washed with a volume of 0.1% sodium hydroxide solution equal to one-half the volume of 0.3% sodium hydroxide solution which was used. The material is again heated with stirring to 65° C., centrifuged and filtered. The two filtrates are combined, the acidity of the mixture adjusted to about pH 2, advantageously with hydrochloric acid, and two volumes of 92% ethyl alcohol are added. The acidity of the alcoholic solution is readjusted to pH 2.0 if necessary and the precipitate formed is allowed to settle at least overnight at room temperature. The following day the clear supernatant fluid is separated from the precipitate by siphoning and centrifuging. The precipitate is washed twice with a small volume of 92% alcohol and dried in vacuo over calcium chloride for 16 hours before being weighed and assayed. The resulting precipitate contains in a relatively pure form (about 20 units per milligram) substantially all of the heparin that was contained in the original extract. The yields we have obtained at this stage still average over 7,000 units per pound of either lung or intestinal tissue treated. This yield is many times that obtainable in a state of equivalent purity by previous methods.

The crude heparin recovered from the extract may be further purified by any suitable purification procedure, for example, the method described in United States Patent 2,377,016.

In our work we have used the unit commonly employed by our Associate, A. F. Charles and which is sometimes called the "Toronto unit."

The following are specific examples of our method.

Example 1.—Beef lung—Extract of pancreatic residues 4 pounds of freshly killed beef lung were finely minced and suspended in 5400 millilitres of tap water. The mixture was heated with stirring to 85° C., maintained at that temperature for ten minutes and then strained through cheesecloth. The drainage water was discarded and the residue mixed with 8000 millilitres of an extract of pork pancreatic residues [United States Patent application, Serial Number 705,248 (Series of 1935)].

Then 80 millilitres of toluene were added as a preservative. The temperature of this digestion mixture was maintained at about 45° C. by means of a water bath, and the digestion allowed to proceed for about 20 hours, during which time the mixture was continuously stirred by a mechanical device. At the beginning of the digestion and at half hour intervals during the first five hours, the acidity was adjusted to pH 8.0—8.2 by addition of 30% sodium hydroxide solution. At the end of the digestion period, only a very small amount of undigested lung tissue remained. The digestion liquid was assayed for its heparin content and found to contain about 46,000 units of heparin. The crude heparin was precipitated and further purified by the procedure previously described. Yield of crude, dried heparin 1.550 grams with a potency of 29 units per milligram. This represented a yield of about 11,000 units per pound of lung tissue.

The pancreatic extract used in this example was prepared as follows: A cylindrical glass jar was loosely filled with about 3000 grams of pork pancreatic residues from which the antidiabetic hormone had been extracted by means of a solution of aqueous ethyl alcohol containing hydrochloric acid. The mouth of the jar was covered with cheese cloth through which a glass tube was inserted and pushed to the bottom of the jar. Cold water was run in at such a rate that a total volume of 3 litres had overflowed in at least one hour. The wet residue was suspended in 12 litres of cold water, and stirred mechanically for half an hour. The acidity at this stage was pH 2.6—2.9. The mixture was allowed to stand at room temperature for 16 hours, stirred again for half an hour and acidity adjusted to pH 5.3. The residue was then allowed to settle and the liquid portion filtered through cloth. The filtrate contained the proteolytic enzyme.

Example 2.—Lung—Extract of sheep pancreas 4 pounds of freshly killed beef lung were finely minced and suspended in 5400 millilitres of tap water. The mixture was heated with stirring to 85° C. and maintained at that temperature for ten minutes and then strained through cheese cloth. The drainage water was discarded and to the residue were added 3200 millilitres of tap water and 1200 millilitres of an extract of sheep pancreas. This latter extract was prepared by extracting 1500 g. of minced frozen sheep pancreas for 18 hours at room temperature with 3000 millilitres of tap water to which had been added 2.1 ml. of concentrated sulphuric acid and 30 millilitres of toluene. The water extract containing the proteolytic enzymes was separated from the solid residue by filtration.

The digestion of the lung and the precipitation of crude heparin was carried out as indicated in Example 1. The digestion liquid was assayed for its heparin content and found to contain about 34,000 units. The yield of precipitated and dried, crude heparin was 1.806 grams with a potency of 19 units per milligram. This represented a yield of about 8700 units per pound of lung tissue.

*Example 3.—Lung—Commercial trypsin*

4 pounds of freshly killed beef lung were finely minced and suspended in 5400 millilitres of tap water. The mixture was heated with stirring to 85° C., maintained at that temperature for 10 minutes and then strained through cheesecloth. The drainage water was discarded and the residue mixed with 5400 millilitres of tap water, 36 g. commercial trypsin and 54 millilitres of toluene.

The digestion of the lung and the precipitation of crude heparin was carried out as indicated in Example 1. The digestion liquid was assayed for its heparin content and found to contain about 43,000 units. The yield of precipitated and dried crude heparin was 1.895 grams with a potency of 23 units per milligram. This represented a yield of about 10,000 units per pound of lung tissue.

*Example 4.—Lung—Protease of bacterial origin*

4 pounds of freshly killed beef lung were heated and digested as in Example 3 except that 240 g. of a proteolytic enzyme of bacterial origin designated as Protease 15 (distributed by Rohm and Haas of Philadelphia), were used instead of the trypsin.

The digestion of the lung and the precipitation of crude heparin was carried out as indicated in Example 1. The digestion liquid was assayed for its heparin content and found to contain about 31,000 units. The yield of precipitated and dried crude heparin was 5.632 grams with a potency of 5.4 units per milligram. This represented a yield of 7500 units per pound of lung tissue.

*Example 5.—Beef intestine—Extract of pancreatic residues*

6.6 pounds of freshly killed beef intestine (small) were finely minced and mixed with 1500 millilitres of tap water. The mixture was heated with stirring to 85° C. for 10 minutes. It was then cooled to room temperature and to it were added 13 litres of cold extract of pork pancreatic residues [U. S. Patent Application Serial Number 705,248 (Series of 1935)]. The cold mixture was stirred and then allowed to stand. After most of the fat had risen to the top of the mixture, it was removed. The mixture was heated in a water bath at 45° C. with mechanical stirring and again more fat was skimmed off. When the temperature of the mixture reached 42° C. the acidity was adjusted to pH 8.5 and periodic adjustment of acidity was carried out thereafter as in Example 1. Digestion was allowed to proceed for 18 hours, the acidity was then adjusted to pH 2.0 with concentrated hydrochloric acid and the mixture was allowed to cool to room temperature. With lung digest under the conditions just given the dissolved heparin along with other dissolved material flocculates in solid form. Sometimes with digestion of intestine partial separation only may take place. In order to bring about more complete separation of the heparin ferric chloride was added to give a concentration of 0.01%. The precipitate was separated by filtration. The subsequent treatment was as indicated in Example 1.

The digestion liquid was assayed for heparin content and found to contain about 96,000 units. The yield of precipitated and dried crude heparin was 4.596 grams with a potency of 13 units per milligram. This represented a yield of about 9000 units per pound of intestinal tissue.

*Example 6.—Beef intestine—Extract of sheep pancreas*

4 pounds of freshly killed beef intestine were finely minced and mixed with 900 millilitres of tap water. The mixture was heated with stirring to 85° C. for 10 minutes and cooled to room temperature. 3200 millilitres of cold water were added, the mixture stirred and then allowed to stand. The fat was skimmed off. 1200 ml. of extract of sheep pancreas prepared as described in Example 2 were added.

The digestion of the intestine and the precipitation of crude heparin was carried out as indicated in Example 1. The digestion liquid was assayed for heparin content and found to contain about 35,000 units. The yield of precipitated and dried crude heparin was 1.058 g. with a potency of 26 units per milligram. This represents a yield of about 6800 units per pound of intestinal tissue.

We claim:

1. The method of producing heparin which comprises coagulating by heat the major portion of the proteins of a tissue of a mammal containing heparin, digesting the resulting coagulated material with a proteolytic enzyme until at least the major portion of the protein is digested, and recovering the heparin from the resulting mixture.

2. The method of producing heparin which comprises coagulating by heat the major portion of the proteins of a tissue of a mammal containing heparin, digesting the resulting coagulated material with trypsin until at least the major portion of the protein is digested, and recovering the heparin from the resulting mixture.

3. The method of producing heparin which comprises coagulating by heat the major portion of the proteins of a tissue of a mammal containing heparin, digesting the resulting coagulated material with a protease enzyme of bacterial origin which digests proteins at a pH between 7 and 8 until at least the major portion of the protein is digested, and recovering the heparin from the resulting mixture.

4. The method of producing heparin which comprises coagulating by heat the major portion of the proteins of a tissue of a mammal containing heparin, digesting the resulting coagulated material with an enzyme-containing extract of pancreatic tissues until at least the major portion of the protein is digested, and recovering the heparin from the resulting mixture.

5. The method of producing heparin which comprises heating an aqueous suspension of lung tissue of a mammal containing heparin to a temperature of 70–90° C. until the proteins in the tissue are substantially completely coagulated, directly subjecting the resulting coagulated material to a proteolytic enzyme until the major portion of the protein in said tissue is digested, and recovering the heparin from the resulting mixture.

6. The method of producing heparin which comprises heating an aqueous suspension of intestine tissue of a mammal containing heparin to a temperature of 70-90° C. until the proteins in the tissue are substantially completely coagulated, directly subjecting the resulting coagulated material to a proteolytic enzyme until the major portion of the protein in said tissue is digested, and recovering the heparin from the resulting mixture.

7. The method of producing heparin which comprises heating an aqueous suspension of tissue of a mammal containing heparin to a temperature of 70-90° C. until the proteins in said tissue are substantially completely coagulated, directly subjecting the resulting coagulated material to a proteolytic enzyme, maintaining the mixture at a pH of at least 7.8 during the digestion and until the major portion of the protein in said tissue is digested, and recovering the heparin from the resulting mixture.

8. The method of producing heparin in accordance with claim 7, in which the tissue is beef lung.

9. The method of producing heparin in accordance with claim 7, in which the tissue is beef intestine.

10. The method of producing heparin in accordance with claim 7, in which the tissue is pork intestine.

EDITH M. TAYLOR.
PETER J. MOLONEY.

REFERENCES CITED

The following references are of record in the file of this patent:

UNITED STATES PATENTS

| Number | Name | Date |
|---|---|---|
| 2,377,016 | Kuizenga | May 29, 1945 |
| 2,410,084 | Kuizenga | Oct. 29, 1946 |

FOREIGN PATENTS

| Number | Country | Date |
|---|---|---|
| 712,564 | Germany | Oct. 21, 1941 |

OTHER REFERENCES

"Heparin," in Am. Druggist, May 1943, pp. 34, 35, 94, 96, 98, 100, 102.

Charles, "Studies on Heparin," J. Biol. Chem. (1933) Vol. 102, p. 425-448.

Kuizenga, in J. Biol. Chem. Vol. 148, June 1943, pp. 641-647.

Mitchell, "A Textbook of Biochemistry," First ed., 1946, p. 466.